United States Patent [19]

Zimmerman

[11] 3,839,240

[45] Oct. 1, 1974

[54] HIGH MELT INDEX MICROPOROUS FILMS
[75] Inventor: Daniel Zimmerman, East Brunswick, N.J.
[73] Assignee: Celanese Corporation, New York, N.Y.
[22] Filed: May 21, 1973
[21] Appl. No.: 362,579

Related U.S. Application Data
[63] Continuation of Ser. No. 125,574, March 18, 1971, abandoned.

[52] U.S. Cl. ............ 260/2.5 HA, 161/159, 161/402, 260/2.5 E, 260/2.5 F, 260/2.5 N, 260/2.5 R, 264/41, 264/48, 264/210, 264/290, 264/346
[51] Int. Cl. ....... C08f 47/08, C08f 29/00, D02j 1/22
[58] Field of Search ................. 260/2.5 HA, 260 E; 161/159; 264/210

[56] References Cited
UNITED STATES PATENTS
3,679,538   7/1972   Druin et al........................ 161/159

*Primary Examiner*—Briggs, Sr., Wilbert J.
*Attorney, Agent, or Firm*—Thomas J. Morgan; Linn I. Grim; Marvin Bressler

[57] ABSTRACT

Microporous films having improved permeability and heat stability are prepared from a precursor film which is based upon a polymer having a melt index of about 5 to about 50 and a weight average molecular weight of about 100,000 to 240,000. Such films are useful as filters, flow control devices and in other areas where improved heat stability and permeability and increased pore sizes are desired.

2 Claims, No Drawings

HIGH MELT INDEX MICROPOROUS FILMS

This is a continuation of application Ser. No. 125,574, filed Mar. 18, 1971 and now abandoned.

INVENTION

This invention relates to a method for improving the heat stability of microporous films while at the same time increasing their permeability.

Microporous films of the type described in copending U.S. application Ser. No. 835,367 filed on June 23, 1969, copending U.S. application Ser. No. 876,511 filed on Nov. 13, 1969, copending U.S. application Ser. No. 84,712 filed on Oct. 28, 1970 and copending U.S. application Ser. No. 104,715 filed on Jan. 7, 1971 are particularly useful as breathable medical dressings such as disclosed in U.S. Pat. No. 3,426,754, issued on Feb. 11, 1969.

However, because of the small pore size of the microporous film prepared as described above, specialized end uses are impractical. Furthermore, the films prepared by the above methods tend to lose permeability when they are held at elevated temperatures.

By means of this invention a technique has been developed for improving the stability at elevated temperatures of microporous film, while at the same time increasing the level of permeability and accordingly, these new films are useable in some highly specialized end uses where shrink resistant films are a necessity. Whereas the pores of previously described microporous films generally did not exceed a maximum pore size of about 5,000 angstroms more usually about 3,000 angstroms. By using the process hereinafter disclosed, it is possible to achieve a significant increase in pore size. Specifically pores as large as 8,000 to 12,000 angstroms are now possible.

Generally the instant invention involves the use of low molecular weight (relatively high melt index) polymers to form microporous films. It was previously thought that optimum properties were obtained with crystalline polymers having melt indices of less than about 5, more usually about 0.5 to 2. However, it has now been found that films having, greater thicknesses, larger sized pores, greater porosity, and improved heat stability can be prepared by using crystalline polymers having melt indices in excess of about 5 and weight average molecular weights less than about 225,000.

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

Furthermore, the pores of the porous films of the present invention are microscopic, i.e., the details of their pore configuration or arrangement are discernible only by microscopic examination.

The microporous films of the present invention are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film, where gross volume is determined by immersing a known weight of the film in a vessel partly filled with mercury at 25°C. and atmospheric pressure. The volumetric rise in the level of mercury is a direct measure of the gross volume. This method is known as the mercury volumenometer method, and is described in the *Encyclopedia of Chemical Technology*, Vol. 4, page 892 (Interscience 1949).

Porous films have been produced which possess a microporous open-celled structure, and which are also characterized by a reduced bulk density. Films possessing this microporous structure are described, for example, in U.S. Pat. No. 3,426,754 which patent is assigned to the assignee of the present invention. The preferred method of preparation described therein involves drawing or stretching at ambient temperatures, i.e., "cold drawing," a crystalline, elastic starting film in an amount of about 10 to 300 percent of its original length, with subsequent stabilization by heat setting of the drawn film under tension such that the film is not free to shrink or can shrink only to a limited extent.

While the above described method or microporous or void-containing film production is useful in this invention the search has continued for new processes able to produce open-celled microporous films having a greater number of pores, a more uniform pore concentration or distribution, a larger total pore area, larger sized pores, and better thermal stability of the porous or voidy film.

A new improved process for preparing open-celled microporous polymer films from non-porous, crystalline elastic polymer starting films, includes (1) cold stretching, i.e., cold drawing the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat setting the resulting porous film under tension, i.e., at substantially constant length, to impart stability to the film. yet another process is similar to this process but consolidates steps (2) and (3) into a continuous, simultaneous, hot stretching-heat setting step, said step being carried out for a time sufficient to render the resulting microporous film substantially (less than about 15 percent) shrink resistant. This process is also useful in conjunction with the low molecular weight polymers in the manner described hereinafter.

The elastic starting film or precursor film is preferably made from crystalline polymers such as polypropylene by melt extruding the polymer into a film, taking up the extrudate at a drawdown ratio giving an oriented film, and thereafter heating or annealing the oriented film if necessary to improve or enhance the initial crystallinity.

The essence of the new improved processes is the discovery that the sequential cold stretching and hot stretching steps impart to the elastic film a unique open-celled structure which results in advantageous properties, including improved porosity, improved thermal stability and a gain or enhancement of porosity when treated with certain organic liquids such as perchloroethylene.

As determined by various morphological techniques or tests such as electron microscopy, the microporous films of the improved process are characterized by a plurality of elongated, non-porous, interconnecting surface regions or areas which have their axes of elongation substantially parallel. Substantially alternating with and defined by these non-porous surface regions are a plurality of elongated, porous surface regions whch contain a plurality of parallel fibrils or fibrous threads. These fibrils are connected at each of their ends to the non-porous regions, and are substantially perpendicular to them. Between the fibrils are the pores or open cells of the films utilized by the present invention. These surface pores or open cells are substantially interconnected through tortuous paths or passageways which extend from one surface region to another surface area or region.

With such a defined or organized morphological structure, the films of the present invention may when the above described improved process is used, have a greater proportion of surface area that the pores cover, a greater number of pores, and a more uniform distribution of pores, than previous microporous films. Further, the fibrils present in the films of the present invention are more drawn or oriented with respect to the rest of the polymer material in the film, and thus contribute to the higher thermal stability of the film.

In fact the total surface area per cubic centimeter of material of the films of this invention have a range of from 2 to about 200 square meters per cc. Preferably the range is from about 5 to about 100 square meters per cc. and most preferably from about 10 to about 80 square meters per cc. These values can be compared with normal pin-holed film which has a total surface area per gram of about 0.1 square meters; paper and fabric which have values per gram of about 1.0 square meters and leather which has a value of about 1.6 square meters per cc. Additionally, the volume of space per volume of material range from about 0.05 to about 1.5 cubic centimeters per gram, preferably from about 0.1 to about 1.0 cubic centimeters per gram, and most preferably from 0.2 to about 0.85 cubic centimeters per gram. Additional data to define the films of this invention relates to Gurley permeability measurements, wherein the instant microporous films (at a standard thickness) have Gurley value (in seconds) of about 2 to about 20 preferably about 5 to about 18 seconds. These values give an indication of porosity, with higher number of seconds indicating lower levels of permeability.

Gurley permeability can be calculated according to ASTM D726 by mounting a film having an area of one square inch in a standard Gurley densometer. The film is subject to a standard differential pressure (the pressure drop across the film) of 12.2 inches of water. The time required to pass 10cm$^3$ of air through the film in seconds is an indication of permeability.

The microporous films of the present invention are formed from a starting elastic film of crystalline, film-forming, polymers. These elastic films have an elastic recovery at zero recovery time (hereinafter defined) when subjected at a standard strain (extension) of 50 percent at 25°C. and 65 percent relative humidity of at least about 40 percent, preferably at least about 50 percent, and most preferably at least about 80 percent.

Elastic recovery as used herein is a measure of the ability of a structure or shaped article such as a film to return to its original size after being stretched, and may be calculated as follows:

Elastic Recovery (ER) = [(length when stretched) − (length after stretching)/length added when stretched] × 100

Although a standard strain of 50 percent is used to identify the elastic properties of the starting films, such strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent and most preferably at least 50 percent, e.g., about 50 to 90 percent, or more. Percent crystallinity is determined by the x-ray method described by R. G. Quynn et al. in the *Journal of Applied Polymer Science*, Vol. 2, No. 5 pp 166–173 (1959). For a detailed discussion of crystallinity and its significance in polymers, see *Polymers and Resins*, Golding (D. Van Nostrand, 1959).

Preferred suitable starting elastic films, as well as the preparation thereof, are further defined in British Pat. No. 1,198,695, published July 15, 1970. Other elastic films which may be suitable for the practice of the present invention are described in British Pat. No. 1,052,550, published Dec. 21, 1966 and are well known in the art.

The starting elastic films utilized in the preparation of the microporous films of the present invention should be differentiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing temperature and complete loss of elastic properties at the glass transition temperatures, are particularly consequences of entropy-elasticity. The elasticity of the starting elastic films utilized herein, on the other hand, is of a different nature. In qualitative thermodynamic experiments with these elastic starting films, increasing stress with decreasing temperature (negative temperature coefficient) may be interpreted to mean that the elasticity of these materials is not governed by entropy effects but dependent upon an energy term. More significantly, the starting elastic films have been found to retain their stretch properties at temperatures where normal entropy-elasticity could no longer be operative. Thus, the stretch mechanism of the starting elastic films is thought to be based on energy-elasticity relationships, and these elastic films may then be referred to as "non-classical" elastomers.

As stated, the starting elastic films employed in this invention are made from a polymer of a type capable of developing a significant degree of crystallinity, as contrasted with more conventional or "classical" elastic materials such as the natural and synthetic rubbers which are substantially amorphous in their unstretched or tensionless state.

A significant group of polymers, i.e., synthetic resinous materials, to which this invention may be applied are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1 or other relatively long chain alkenes, as well as copolymers of 3-methyl pentene-1 and any of the same n-alkenes mentioned previously in connection with 3-methyl butene-1. These polymers in the form of film should generally have a percent crystallinity of at least 20 percent, preferably at least 30 percent, and most preferably about 50 percent to 90 percent or higher.

As set forth above the instant invention resides in the discovery that the use of higher melt index (or lower molecular weight) starting polymers produces microporous films having increased pore sizes and exceptional heat shrinkage stability. In addition, by utilizing such starting polymers the preparation of thicker films is possible. Generally it has been discovered that any appreciable increase in melt index will increase pore size and heat stability over the corresponding values obtained from microporous films prepared from lower melt index films. In other words, a general increase in pore size distribution is observed. Likewise, where previously known microporous films have shown tendencies to shrink, retract or lose porosity as they are heated, such an effect is greatly reduced by the present invention.

The term melt index as used herein is defined as the value obtained by performing the ASTM test described for the particular polymer in question. For polypropylene the test is ASTM 1958 D-1238-57T, Part 9, p. 38. This test involves the determination of the amount of the polymer in question which flows through a standard orifice at a particular temperature (230°C. for polypropylene and 170°C. for polyethylene). It can thus be seen that as the viscosity or molecular weight of a particular polymer increase, it will be more difficult for that polymer to flow at a given temperature resulting in smaller amounts of polymer being collected and lower melt indices.

Although the prior art has generally recognized that a wide range of melt indices or molecular weight polymers can be used to produce microporous films, there was no recognition of the improved properties achieved when higher melt index resins are used. While the prior art was concerned with an preferred to use materials having melt indices, in the range of about 0.5 to 2; it has now been found that particularly significant increases in pore size and heat shrinkage stability result when microporous films are prepared from polymers having melt indices of about 5 to about 50 preferably about 8 to 30.

Heat stability as referred to above, can be expressed by measuring the percent decrease in permeability caused by subjecting a film sample to a certain amount of heat. The films of the instant invention can be further characterized by their superior retention of permeability measured at 95°C. for one hour. While the microporous films of the prior art seldom exceeded the 50 percent level and were often less than this, the instant films exceed 60 percent retention of permeability under these conditions, and preferably exceed 75 percent most preferably 80 percent.

Instead of expressing this point of particularly significant increase in pore size and heat stability in terms of melt index, it may be expressed in terms of molecular weight. The molecular weight can change from about 100,000 to about 240,000 preferably 150,000 to 240,000.

Of particular significance in preparing the microporous films having the improved properties disclosed herein are those prepared using polypropylenes specifically polypropylene having the melt indices and molecular weights set out above.

While the present disclosure and examples are directed primarily to the aforesaid olefin polymers, the invention also contemplates the high molecular weight acetal, e.g., oxymethylene polymers. While both acetal homopolymers and copolymers are contemplated, the preferred acetal polymer is a "random" oxymethylene copolymer, one which contains recurring oxymethylene, i.e., $-CH_2-O-$, units interspersed with $-OR-$ groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and wherein a major amount of the $-OR-$ units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent or higher. Further, these polymers have a melting point of at least 150°C. For a more detailed discussion of acetal and oxymethylene polymers, see *Formaldehyde*, Walker, pp. 175-191, (Reinhold, 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, all of which are well known in the art and need not be described further herein for sake of brevity.

The types of apparatus suitable for forming the starting elastic films of this invention are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combinations or stages may be used. The die opening or slot width may be in the range, for example, of about 10 to 200 mils.

Using this type of apparatus, film may be extruded at a drawdown ratio of about 20:1 to 200:1, preferably 50:1 to 150:1.

The terms "drawdown ratio" or, more simply, "draw ratio," as used herein is the ratio of the film wind-up or take-up speed to the speed of the film issuing at the extrusion die.

The melt temperature for film extrusion is, in general, no higher than about 100°C. above the melting point of the polymer and no lower than about 10°C. above the melting point of the polymer.

For example, polypropylene may be extruded at a melt temperature of about 180°C. to 270°C., preferably 200°C. to 240°C. Polyethylene may be extruded at a melt temperature of about 175°C. to 225°C., while acetal polymers, e.g., those of the type disclosed in U.S. Pat. No. 3,027,352 may be extruded at a melt temperature of about 185°C. to 235°C., preferably 195°C. to 215°C.

The extrusion operation is preferably carried out with rapid cooling and rapid drawdown in order to obtain maximum elasticity. This may be accomplished by having the take-up roll relatively close to the extrusion slot, e.g., within two inches and, preferably, within one inch. An "air knife" operating at temperatures between, for example 0°C. and 40°C., may be employed within one inch of the slot to quench, i.e., quickly cool and solidify the film. The take-up roll may be rotated, for example, at a speed of 10 to 100 ft/min., preferably 50 to 500 ft/min.

While the above description has been directed to slit die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide quick and effective cooling. Means such as cooling mandrel may be used to cool the interior of the tubular film. After a short distance during which the film is allowed to completely cool and harden, it is wound up on a take-up roll.

Using the blow film method, the drawdown ratio is preferably 20:1 to 200:1, the slot opening 10 to 200 mils, the $D_2/D_1$ ratio, for example, 0.5 to 6.0 and preferably about 1.0 to about 2.5, and the take-up speed, for example, 30 to 700 ft/min. The melt temperature may be within the ranges given previously for straight slot extrusion.

The extruded film may be then initially heat treated or annealed in order to improve crystal structure, e.g., by increasing the size of the crystallites and removing imperfections therein.

The resulting partly-crystalline film is then subject to a process generally comprising the steps of stretching and heat setting the starting film. In this process the microporous film which is formed by the stretching operation is stabilized by the heat setting operation. Preferably the process comprises either the consecutive steps of cold stretching, hot stretching and heat setting or the consecutive steps of cold stretching and simultaneously hot stretching and heat setting the starting film. Other variations on this process (such as the elimination of the hot stretching step) can be carried out resulting in microporous films which, although slightly inferior to those films made by the cold stretch — hot stretch — heat set process, still find utility as the microporous films of this invention.

The term "cold stretching" or stretching as used herein is defined as stretching or drawing a film to greater than its original length and at a stretching temperature i.e., the temperature of the film being stretched, less than the temperature at which the melting of the film begins when the film is uniformly heated from a temperature of 25°C. at a rate of 20°C. per minute. The terms "hot stretching" or "hot stretching-heat setting" as used herein is defined as stretching above the temperature at which melting begins when the film is heated from a temperature of 25°C. at a rate of 20°C. per minute, but below the normal melting point of the polymer, i.e., below the temperature at which fushion occurs. For example, using polypropylene elastic film, cold stretching is carried out preferably below about 120°C. while hot stretching or hot stretching — heat setting is carried out above this temperature.

When a separate heat setting step is employed, it follows the cold stretching — heat stretching steps and is carried out at from about 125°C. up to less than the fusion temperature of the film in question. For polypropylene the range preferably is about 130°C. to about 160°C.

The total amount of stretching or drawing which should occur when either single stretching or consecutive stretching steps are utilized is in the range of about 10 to about 300 percent of the original length of the film prior to stretching.

The resulting microporous film exhibits a final crystallinity of preferably at least 30 percent, more preferably about 50 to 100 percent as determined by the aforementioned x-ray method and as previously defined an elastic recovery from a 50 percent strain of at least 50 percent, preferably 60 to 85 percent. Furthermore, this film can exhibit an average pore size of about 100 to 12,000 angstroms more usually 150 to 7,000 angstroms. These values can be determined by mercury porosimetry as described in an article by R. G. Quynn et al., on pages 21–34 of *Textile Research Journal*, January, 1963 or by the use of electron microscopy as described in Geil's *Polymer Single Crystals*, p. 69 (Interscience 1963). When an electron micrograph is employed pore length and width measurements can be obtained by simply utilizing a ruler to directly measure the length and width of the pores on an electron micrograph magnified photograph taken usually at 10,000 to 50,000 magnification. Generally the pore length values obtainable by electron microscopy are approximately equal to the pore size values obtained by mercury porosimetry. This compares to the usual maximum average pore size for the prior art microporous films of about 5,000 angstroms.

The films of this invention find application in areas wherever breathability and porosity superior to that of the prior art films is desired. For example, these films are useful in the preparation of barriers having increased moisture transmission rates such as clothing, sterile packaging, separation filters and the like. While the instant films do exhibit increased pore size they are still an effective barrier to most bacteria. In addition, the instant films are quite useful in areas where films are required to be exposed to heat with a maximum of shrinkage, i.e., sterilizable packaging.

EXAMPLE I

Crystalline polypropylene having a melt index of 0.7, a molecular weight of about 473,000 and a density of about 0.91 was melt extruded at 230°C. through a 2 inch annular die having a 0.075 inch opening. The hot tube thus formed was expanded 1.2 times by internal air pressure and cooled by an air stream impinging on the film from an air ring located around and above the die. The extrusion was accomplished with an extruder of 24:1 length to diameter ratio and a shallow channel metering screw. The extrudate was drawn down to a drawdown ratio of 75:1 and passed through a series of rollers which collapsed the tube. The film produced in this fashion was found to have the following properties; thickness, 0.001 inches; recovery from 50 percent elongation at 25°C. 50.3 percent; crystallinity, 59.6 percent.

A sample of this film was oven annealed with air with a slight tension at 140°C. for about 30 minutes, removed from the oven and allowed to cool. It was then found to have the following properties; recovery from a 50 percent elongation at 25°C., 90.5 percent; crystallinity, 68.8 percent.

Samples of the annealed elastic film were then subjected to an extension ratio of 0.9 and thereafter set under tension, i.e., at constant length, at 145°C. for 10 minutes in air. The cold drawing portion was conducted at 25°C., the hot drawing portion was conducted at 145°C., total draw was 100 percent, based on the original length of the elastic film.

EXAMPLES II – VII

Using the same procedure as in Example I six different microporous film samples were prepared from various conventionally stabilized polypropylene resins. Examples II – IV respectively are Enjay resins 612, CD2D, CD-305 and CD-306, all available from the Esso Company, while Example V is Phillips Petroleum Company No. 9400 and Example VI is Hercules Powder Company No. 6201 (contains no stabilizer). Example VII is a 50/50 weight basis blend of Examples I and IV.

In the following Table all resins were evaluated for permeability using a Gurley densometer according to ASTM No. D726: the sameple was inserted into the densometer and a one inch square portion thereof was subject to a pressure of 12.2 inches of water. The time required to pass 10cm³ of air through the one inch square portion of the sample was recorded (in seconds) as a measure of permeability. As the number of seconds required to pass the set volume of air increases the permeability decreases. In order to determine heat stability, a second permeability determination was made after exposing the film sample to 95°C. for one hour. The amount of permeability reduction is indicated.

Permeability and Heat Stability of Various Microporous Polypropylene Resins

| Example | Mol. Wt. (avg.) | Melt Index | Permeability (seconds) | % of Permeability Retention After 1 hour at 95°C. |
|---|---|---|---|---|
| I | 473,000 | 0.7 | 40 | 50 |
| II | 329,000 | 3.2 | 25 | not determined |
| III | 236,000 | 5.0 | 15 | 85 |
| IV | 184,000 | 9.6 | 10 | 95 |
| V | 287,000 | 5.3 | 10 | not determined |
| VI | 264,000 | >40.0 | 10 | not determined |
| VII | blend | 2.8 | 20 | not determined |

As can be seen from Table I the conventional prior art example — Example I — exhibited a high molecular weight (473,000) a low melt index (0.7) and poor permeability and heat stability. However, as the molecular weight of the samples was decreased and the melt index increased more permeable, more stable films resulted. In fact, the lowest molecular weight resin produced a microporous film having the best permeability and heat stability. See Example IV.

EXAMPLE VIII

The pore size distribution was determined for the films prepared in Examples I, III and IV. See the FIGURE where it is shown that both pore width and pore length increase as melt index is increased or molecular weight decreased.

In the FIGURE pore width and length are plotted versus cumulative percent for the Examples I, III and IV. For example, about 85 percent of the pores of Example IV have a pore length below 6,000 angstroms. In Example III, 85 percent of the pores have a length below about 2,800 angstroms while for Example I the figure is about 2,200 angstroms.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. In a process for preparing an open-celled microporous polypropylene film utilizing a non-porous crystalline elastic polypropylene starting film having an elastic recovery from a 50 percent extension at 25°C. of at least 40 percent and a percent crystallinity of at least 20 percent, which process comprises stretching said starting film until an open-celled microporous structure is formed in said film and heat setting the resulting stretched film, to stabilize the open-celled structure in the stretched film, to improvement which comprises utilizing a polypropylene polymer having a melt index in the range of from about 8 to about 30 and a weight average molecular weight of about 100,000 to 240,000 wherein the resulting film exhibits improved heat stability, improved permeability and larger pore sizes over corresponding films having lower melt indexes and higher molecular weights.

2. The process of claim 1 wherein said stretching operation comprises the steps of cold stretching and hot stretching the crystalline elastic polypropylene film.

* * * * *